(No Model.) 7 Sheets—Sheet 1.

T. MUNNELL.
CASH REGISTER.

No. 354,483. Patented Dec. 14, 1886.

WITNESSES:
Dugald McKillop
Robert Kirk

INVENTOR:
Thomas Munnell
By J. S. Zerbe
Attorney (No Model.) 7 Sheets—Sheet 2.

T. MUNNELL.
CASH REGISTER.

No. 354,483. Patented Dec. 14, 1886.

WITNESSES:
Dugald McKillop
Robert Kirk

INVENTOR:
Thomas Munnell
By
J. S. Zerbe
Attorney.

(No Model.) 7 Sheets—Sheet 3.

T. MUNNELL.
CASH REGISTER.

No. 354,483. Patented Dec. 14, 1886.

WITNESSES: Dugald McKilloh, Robert Kirk.

INVENTOR: Thomas Munnell
By J. S. Zerbe, Attorney.

(No Model.) 7 Sheets—Sheet 4.

T. MUNNELL.
CASH REGISTER.

No. 354,483. Patented Dec. 14, 1886.

WITNESSES: Dug. McKillop, Robert Kirk

INVENTOR: Thomas Munnell
By J. J. Zeile, Attorney.

(No Model.) 7 Sheets—Sheet 5.

T. MUNNELL.
CASH REGISTER.

No. 354,483. Patented Dec. 14, 1886.

WITNESSES:
Dugald McKillop
Robert Kirk

INVENTOR:
Thomas Munnell
By J. S. Gerbz
Attorney.

(No Model.)  
7 Sheets—Sheet 6.

T. MUNNELL.
CASH REGISTER.

No. 354,483. Patented Dec. 14, 1886.

WITNESSES:  
Dugald McKillop  
Robert Kirk.

INVENTOR:  
Thomas Munnell  
By J. S. Zerbe  
Attorney.

(No Model.) 7 Sheets—Sheet 7.

T. MUNNELL.
CASH REGISTER.

No. 354,483. Patented Dec. 14, 1886.

WITNESSES:
Dugald McKillop
Robert Kirk

INVENTOR:
Thomas Munnell
By J. S. Zerbe
Attorney.

UNITED STATES PATENT OFFICE.

THOMAS MUNNELL, OF MOUNT STERLING, KENTUCKY.

CASH-REGISTER.

SPECIFICATION forming part of Letters Patent No. 354,483, dated December 14, 1886.

Application filed March 4, 1886. Serial No. 194,039. (No model.)

*To all whom it may concern:*

Be it known that I, THOMAS MUNNELL, of Mount Sterling, in the county of Montgomery and State of Kentucky, have invented a new and useful Improvement in Cash-Registers, which improvement is fully set forth in the following specification and accompanying drawings, in which—

Figure 1:
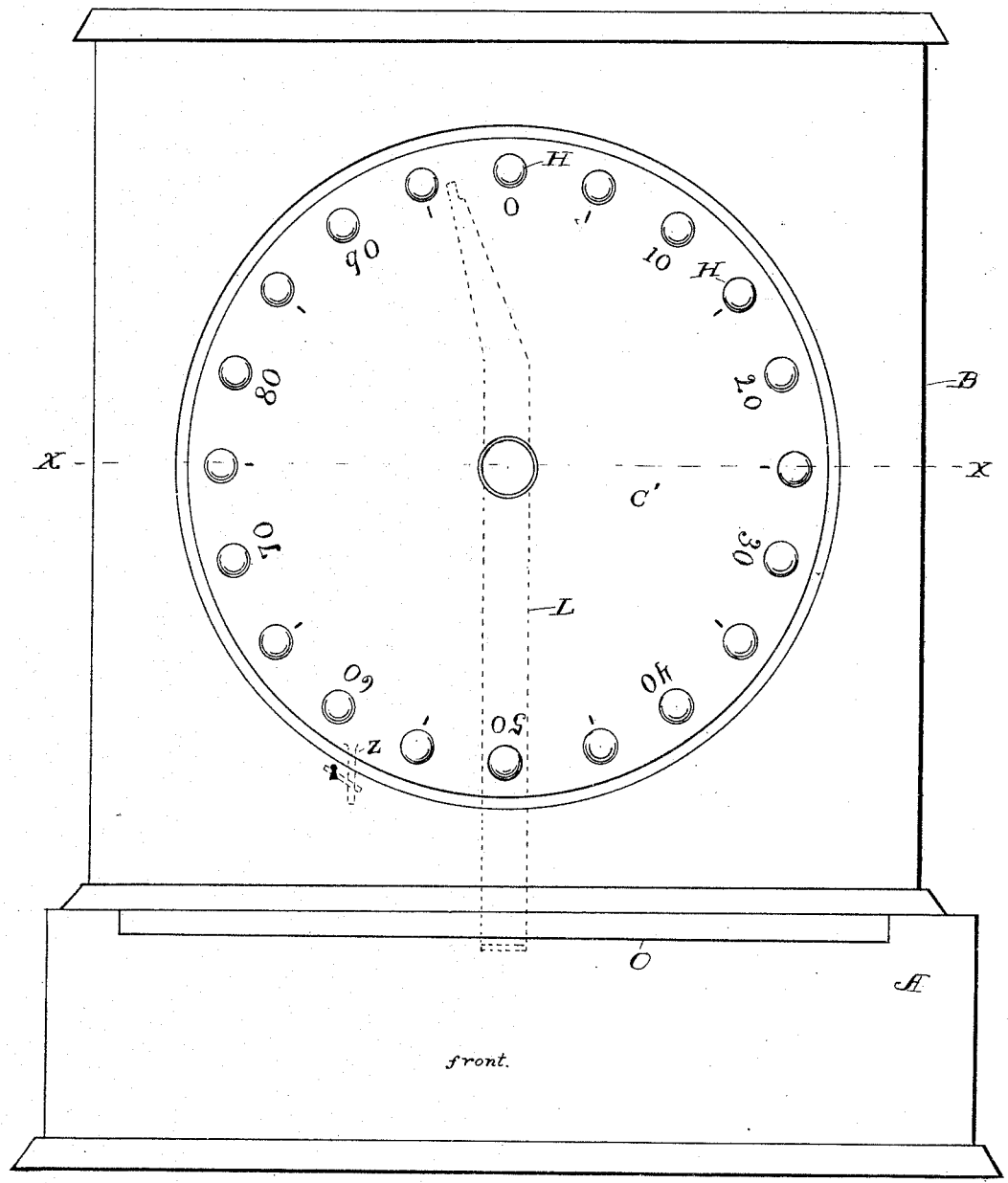
Figure 2:
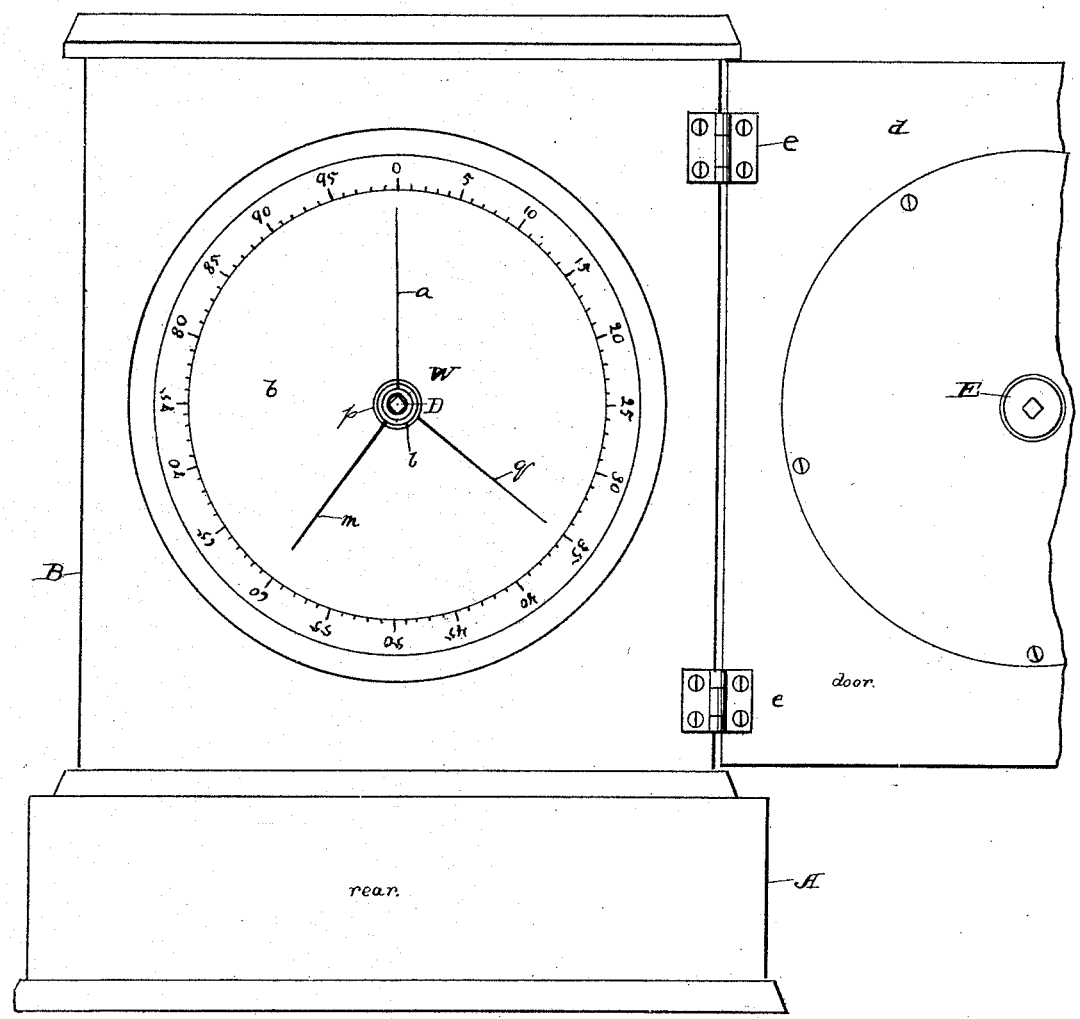
Figure 3:
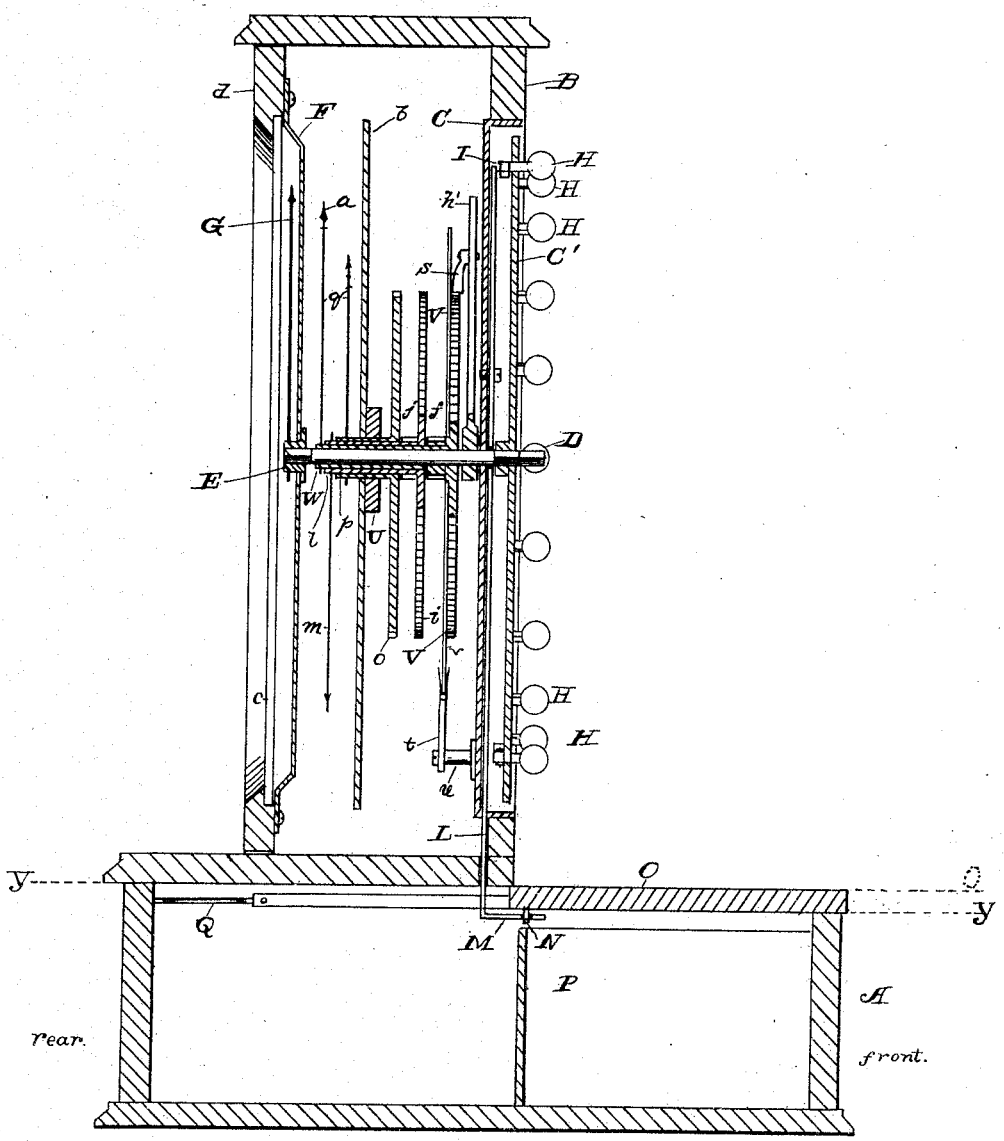
Figure 4:
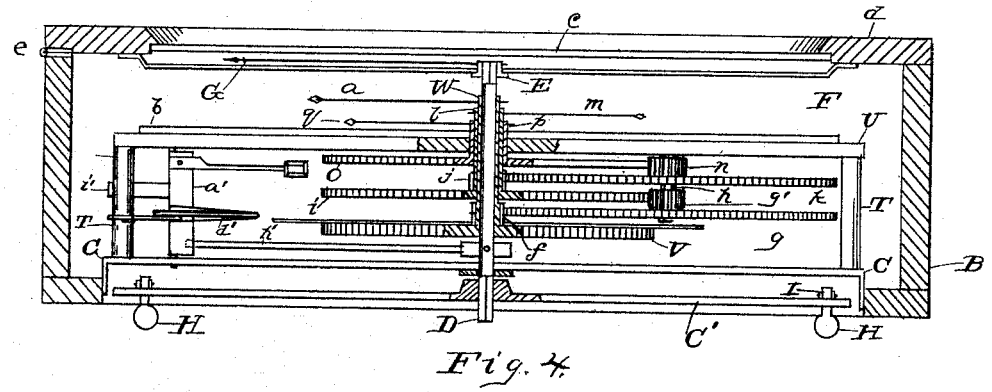
Figure 5:
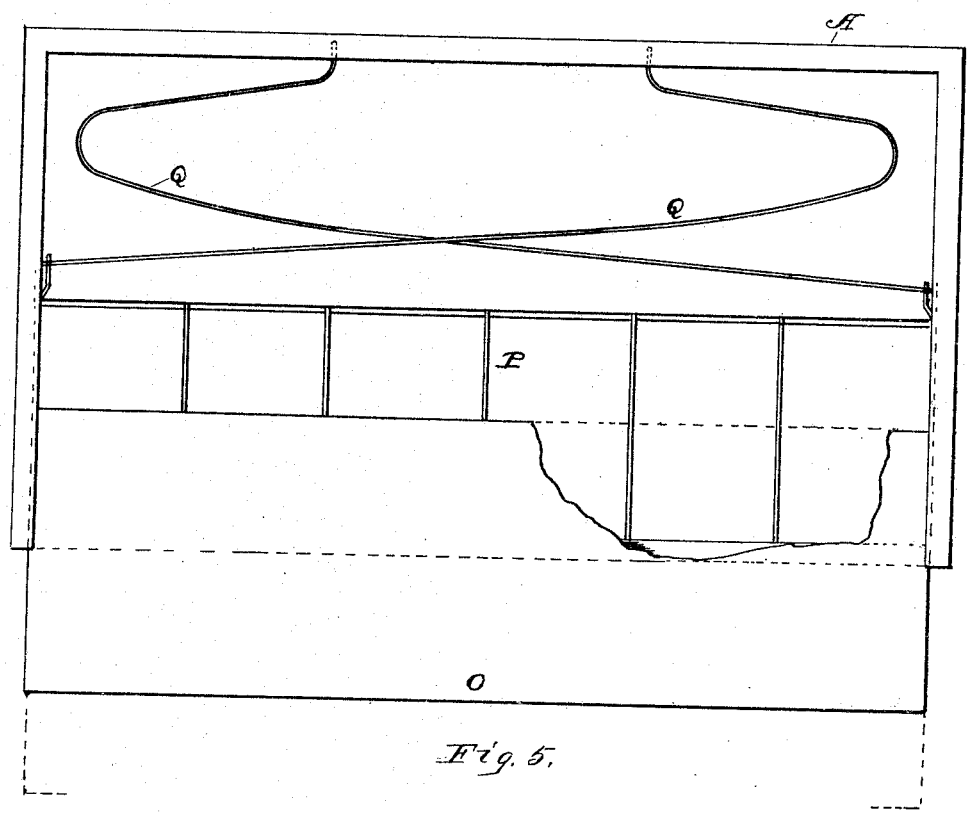
Figure 6:
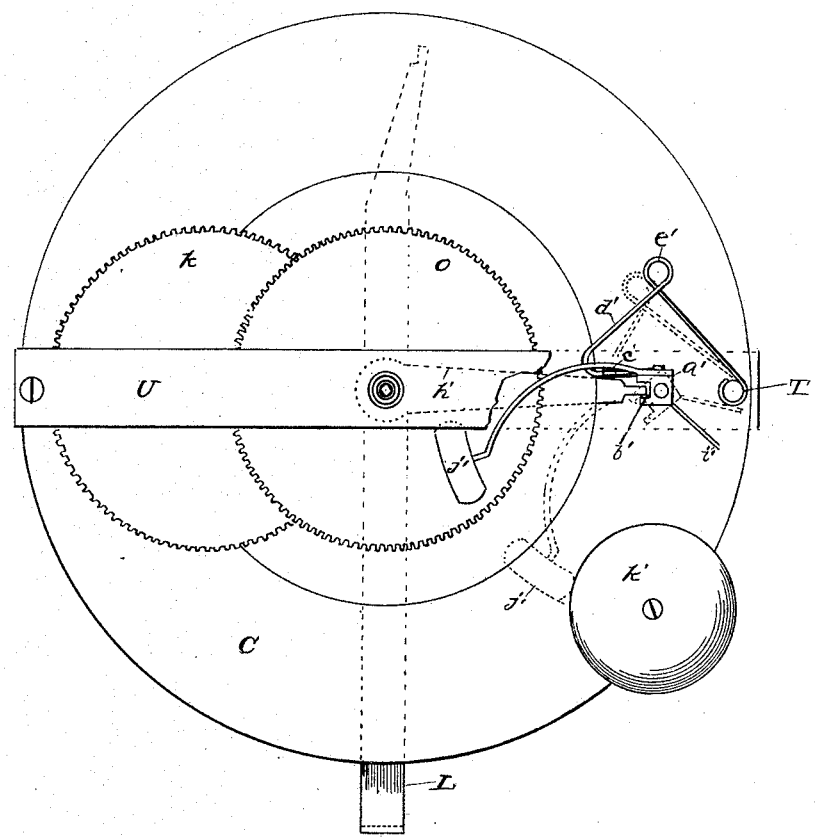
Figure 7:
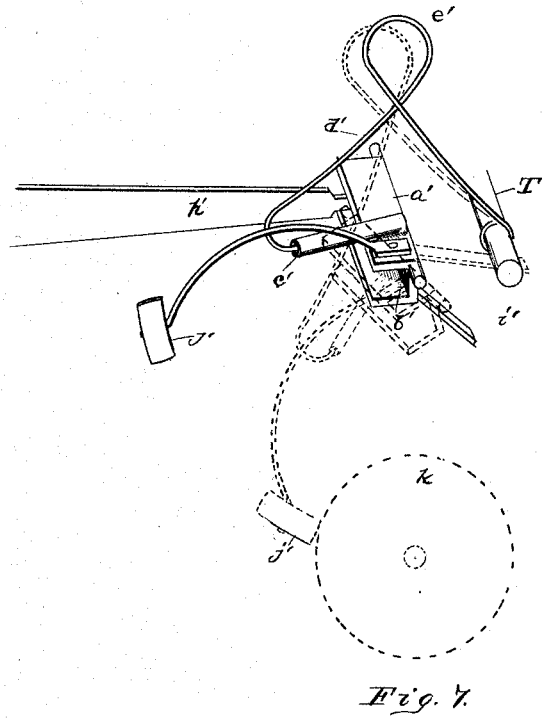
Figure 8:
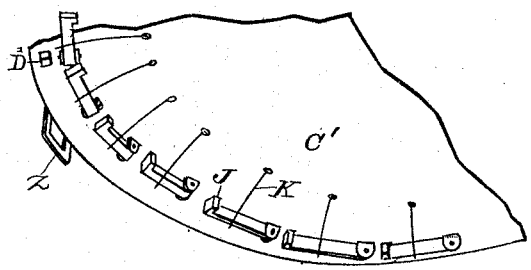
Figure 9:
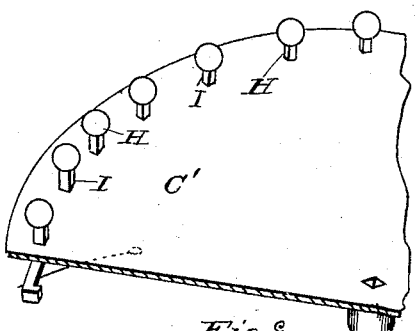
Figure 10:
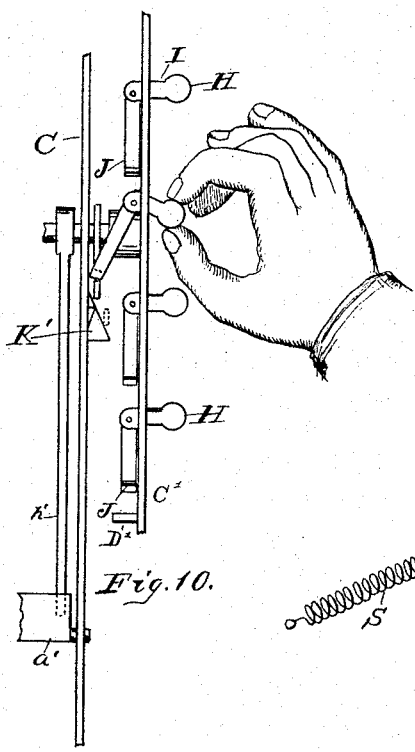
Figure 11:
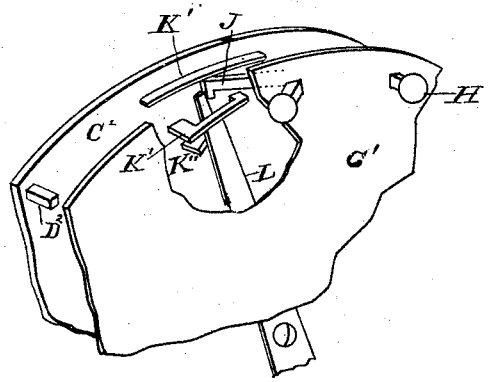
Figure 12:
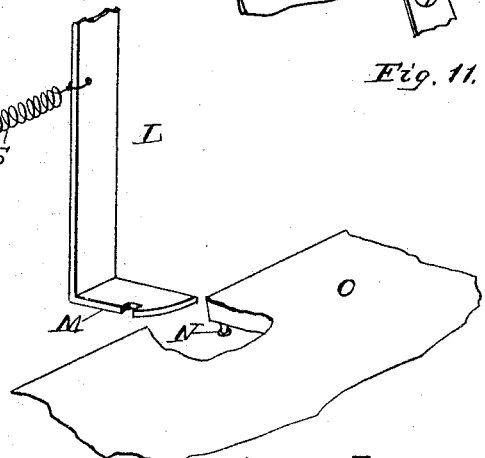

Figure 1 is a front view of my improved cash-register; Fig. 2, a rear view showing the private dial with a door carrying the customer's dial upon it; Fig. 3, a longitudinal vertical central section; Fig. 4, a horizontal section at X X, Fig. 1; Fig. 5, a horizontal plan section through Y Y, Fig. 3; Fig. 6, a rear view of the internal mechanism; Fig. 7, a perspective view of the mechanism operating the bell; Fig. 8, a perspective view of a section of the inner face of the operating-dial; Fig. 9, a perspective view of the outer face; Fig. 10, a side view of a section of this operating-dial; Fig. 11, a perspective view of a section of the operating-dial and mechanism operating the cash-drawer, and Fig. 12 a perspective view of the lower end of the lever operating the cash-drawer.

This invention relates to an improvement in cash-registers, consisting of an operating-dial rotating on a central stem operating a train of wheels within the device, which operate a series of dial-fingers on a private dial at the back part of the device, and a customer's dial outwardly at the back of the device. This operating-dial is provided, near its periphery, with a series of knobs. This operating-dial is provided with a series of numbers from one to ninety, with a knob and lever concaved at each alternate fifth number, so that this dial may be rotated from its normal position forwardly as far as the zero-point of the dial, and reversed, thus registering any sum corresponding with the number of each knob. Each movement of this operating-dial is indicated both on the private dial and the customer's dial at the back part of the device, and by means of a vertical lever the lid of the cash-drawer is opened, permitting the operator to make change therefrom, and simultaneously with each operation a bell within the device is rung, all of which will now be fully set forth in detail.

In the accompanying drawings, A represents the base, and B the upper part or upright frame, of my improved cash-register. Within the upright frame B, I provide a circular plate, C, secured thereto, having centrally journaled therein a horizontal stem, D, resting at its inner end and connecting rearwardly with a sleeve, E, journaled centrally within a dial-plate, F, secured in turn to the case. The hand G on this sleeve E is movable by means of the stem D over the dial F. The movable dial C' is fixed securely to the forward end of the stem D, as shown in Fig. 1, and is provided with a series of numbers thereon from zero to one hundred. Opposite each of these numbers is a knob, H, Fig. 1, and also in Figs. 9 and 10, having a bar, I, extending through the dial-plate C', where it is hinged, and thence bent almost at right angles, forming a lever, J, having a wire spring, K, as shown in Fig. 8, which holds this lever J parallel with the inner face of the plate C' normally, and is designed to operate between the concentric keepers K', secured to the circular plate C. This lever J is so made and disposed that its forward end, slightly bent at right angles, engages with the upper end of a lever, L. Between the concentric keepers K' an incline, K'', is provided, so that the lever L is pushed forward by the arm J until it rises higher than the angled end of the arm J, when the force of the spring S moves it back over the angled end of the said arm J. The position of the operating-dial C' is such that when normally disposed the zero and accompanying knob H are vertically above the central stem, D, and the lever L is journaled in such a position vertically that the upper end will engage with the forward end of the lever J when in that position. The lever L extends downwardly forward of the circular plate C, and is provided at its lower end with a forwardly-projecting hook, M, so disposed as to engage with a lug, N, on the lower face of the lid O, covering the cash-drawer P. The cash-drawer P, as shown in Figs. 3 and 5, is stationary within the base of the device, while the lid O is operated thereon.

Rearwardly within the device wire springs Q are placed to engage with the said lid O, so that whenever the lever J is operated the hook M is disengaged from the lug N and said lid O will move forward, as indicated by dotted lines, Fig. 3, and thus uncover the cash-drawer.

Any number from one cent to one dollar may thus be registered—as, for instance, when five cents is to be registered, the knob H opposite this number is grasped and moved forward in connection with the operating-dial to the normal position of the zero-knob, which is as far as it can be moved by a single operation, being simply stopped by a lug, D', (see Fig. 8,) on the back side of the said dial coming in contact with another lug, $D^2$, (see Fig. 11,) on the plate C. Again, in registering ninety-nine cents, the zero-knob is operated four times, thus registering four ones, then operate the knob opposite the number ninety-five once, thus making in all ninety-nine.

As the knob H is grasped the effort necessary to turn the movable dial throws the forward end of the lever J outwardly at an angle from the inner face of the operating-dial, as shown in Fig. 10. When it comes up near to the vertical point it will engage with the upper end of the lever L, and move it slightly, as explained above, thus releasing the lid O of the cash-drawer below. All the other levers J are held down flat against the inner face of the operating-dial by means of the springs K, and thus pass over the lever L without engaging therewith. A spiral spring, S, near the lower end of the lever L, is designed to return it to its original position after the lever J moves it forward. Thus any number from 5 to 100 may be indicated by simply grasping the knob corresponding with the desired number and moving it around to the zero-point. It will be necessary, however, to first return the movable disk or operating-dial to its original position with the zero above the stem D before making the next register. The lower part of the movable dial C' is provided with a lug, Z, having a slot therein and a small lock in such a position that the bolt Z' will engage therewith when the zero-point of the operating-dial is in its normal position vertically above the axis. The key is designed to be in the possession of the operator, so that when not in use the dial may be secured in position, and thus prevent it from being rotated, and preventing any operation of the device.

On the inner face of the dial C is provided, at two diametrically-opposite points, a post, T, Fig. 4, at right angles therewith, connected by the bridge U, and the stem D, journaled through the plate C, passes through an opening centrally in this bridge. Just within the plate C the stem D has a spur-wheel, V, the hub projecting inwardly, forming a sleeve, W, projecting through the bridge U, and is provided at its extreme inner end, near the dial F, with a hand, $a$. Thus the hand $a$, being integral with the sleeve W, rotates therewith over a private dial, $b$, rearwardly within the case and secured to the bridge U. The extreme inner end of the stem D is formed square, to receive the sleeve E, journaled centrally within the dial F, and has a hand, G, thereon, which rotates in connection therewith. This dial F is stationary and numbered to correspond with the dial C' at the front of the case, commencing with zero at the top, and is protected outwardly with a glass, $c$. The dial F and glass $c$, carrying the sleeve E and hand G, are fixed within the lid or door $d$, hinged at one side to the case, as shown at $e$. This dial F is exposed to the customer, and this door $d$ may be opened, carrying with it the dial F, sleeve E, and hand G, thus exposing the private dial $b$.

The part of the sleeve W next the spur-wheel V has a pinion, $f$, thereon, which engages with a spur-wheel, $g$, corresponding in size with the spur-wheel V. This wheel $g$ is journaled upon the stem $h$, on the inner side of the bridge U. A pinion, $g'$, is formed integral with the inner side of the spur-wheel $g$, which in turn engages with a spur-wheel, $i$, journaled upon the sleeve W on the stem D. Laterally this spur-wheel $i$ has a pinion, $j$, formed integral therewith, engaging with another spur-wheel, $k$, upon the stem $h$. The pinion $j$ is disposed laterally by means of a sleeve, $l$, which is outside of the sleeve W, and extends also through the bridge U, and is provided outwardly with a hand, $m$, rotating just beneath the hand $a$. Laterally on the spur-wheel $k$, and integral therewith, is a pinion, $n$, engaging with a spur-wheel, $o$, journaled on the sleeve $l$. This spur-wheel $o$ has a laterally-disposed sleeve, $p$, provided at its outer end, just inwardly from the hand $m$, with a third hand, $q$. The spur-wheels V, $g$, $i$, $k$, and $o$ are all designed to be of the same size and provided with one hundred cogs each, and the pinions $f$, $g'$, $j$, and $n$ are also of the same size and provided with ten cogs each, so that while the outer hand, G, and stem D make one revolution the second hand $m$ upon the sleeve $l$ moves only one point forward, or the one-hundredth part of the distance passed over by hand $a$, and the third hand, $q$, will move forward only the one-hundredth part of the distance passed over by hand $m$.

Between the plate C and the spur-wheel V is an arm, $h'$, fixed rigidly upon the stem D, which has a pawl, $s$, near its outer end, engaging with the teeth of the spur-wheel V. Thus whenever the movable dial C' is moved forward by means of one of the knobs H, the said pawl $s$, engaging with the said spur-wheel V, will move the entire train of mechanism; but the said mechanism remains stationary whenever the operating-dial C' is reversed before the next operation.

In order that the spur-wheel V and the accompanying mechanism may not be reversed when the operating-dial C' is moved backward, a rubber or bracket, $t$, is placed in such a position upon the post $u$ as to engage with the periphery of a disk, $v$. Fig. 6, showing a view of the internal mechanism, has a bridge, U, broken away at one end so as to expose the attachment designed to ring the bell. This attachment is shown enlarged in Fig. 7, and consists of a metal piece, $a'$, (see Fig. 4,) journaled at the ends to the plate C and bridge U, and provided at the side next to the train of wheels with a longitudinal slot, $b'$. This slot is so disposed that the outer end of the arm $h'$ will in its operation engage therewith. The upper side of this metal piece $a'$ has a forwardly-projecting tube, $c'$, the forward end of which receives the end of a spring, $d'$, forming a loop, $e'$, thence bending downwardly and rearwardly where the opposite end is secured to the bridge-post T. The tension of this spring is such as to press down the forward end of the tube $c'$, when it assumes the position as shown by dotted lines.

Projecting rearwardly from the metal piece $a'$ is a lug or arm, $i'$, that comes in contact with the post T. The normal position of the arm $h'$, when the operating-dial C' is with its zero point vertically above its axis, is within the slot $b'$ at the forward side of the metal piece $a'$. Then, as the operating-dial C' is manipulated by the knobs H, this arm is moved downwardly, partially rotating the metal piece $a'$ to the position shown by the dotted lines in Fig. 7, which prevents the said arm $h'$ from becoming detached from the slot $b'$, and rotates at a distance to correspond with the movement of the operating-dial C'. The tension of the spring $d'$ is such that after the said metal piece $a'$ is rotated very slightly the spring will cause it to descend quickly, throwing the hammer $j'$ down against the bell $k$. The arm $i'$ striking the post T causes a slight rebound of the hammer $j'$ from the bell, thus not interfering with its resonance. This metal piece, the bell, and the spring thus remain in the position indicated by the dotted lines until the operating-dial C' is reversed, bringing the zero-point up vertically or to its starting point. The arm $h'$, being thus returned to its original position in connection with the bell $j$ and spring $d'$, throws the spring back.

As will be noticed, there are three dials connected with this device, the first dial, C', being next the operator, the private dial $b$, within the back of the case having the series of three hands, $a$, $m$, and $q$, operating over the said dial $b$, as shown in Fig. 2, and the third or customer's dial, F, at the rear part of the device, fixed within the door $d$, which, on being opened, carries with it the sleeve E, and the dial-hand G detaching them from the rear end of the stem D, so as to expose the interior or private dial $b$. This door is designed to be provided with a lock, the key of which is in possession of the proprietor. The three dials have similar figures, or indices, with the zero-point vertically above the axis.

In operating the device, when it is desired to register any sum and make change, the knob H, opposite the number desired to be registered, is grasped by the operator and turned up to the zero-point. The slightest rotation of the operating-dial will move the lever $h'$ and cause the partial rotation of the metal piece $a'$, permitting the hammer $j'$ to fall and strike the bell $k'$. The dial-finger G, rotating with the stem D and the operating-dial C', indicates to the customer the amount registered on the dial-plate F, and corresponds in amount to that number adjacent to the knob which the operator grasps. The forward movement of the knob in the effort necessary to rotate the operating-dial throws the arm J inwardly at an angle from the inner face of the plate C', and just before the dial C' reaches the terminal point in its rotation the forward end of the said arm J comes in contact with the upper end of the lever L and carries it slightly forward. This movement of the lever L releases the hook M at its lower end from the lug N on the inner face of the till, and the springs Q, rearwardly within the device connecting with the said lid, throws it forward, exposing the interior of the till. Thus change may be made.

It will be noticed that this method of operating the device compels a registration of the money received before an operator can get at the cash-tills, either to deposit the money or get the change therefrom.

Although the hand G, rotating over the dial F, corresponds with the rotation of the dial C' and is reversible, the hands $a$, $m$, and $q$ rotate only in one direction whenever the operating-dial C' is rotated, and is prevented from any backward movement by the friction rubber or brake $t$ against the face of the plate $v$. The multiplex system of the registering-hands $a$ $m$ $q$ caused by the train of wheels has already been described, and serves at any moment to show to the operator the exact amount that has been previously recorded.

As will be observed, the lug D' on the inner face of the operating-dial C' is designed to stop the operating-dial when it is reversed; and in this connection it is important to note that the bell $k'$ cannot be rung until the operating-dial is reversed and the lug D' comes in contact with the lug $D^2$ on the plate C, thus making a correct registry.

Having described my invention, what I claim as new is—

1. In a cash-register having a movable dial, a registering-dial and a customer's dial, the said operating-dial carrying knobs and levers opposite numbers corresponding with the amount to be registered, the customer's dial indicating each separate movement and the multiplex private dial making a continuous registry, the several parts constructed and combined substantially as herein set forth.

2. In a cash-register, a movable dial rotating in connection with a central stem and having peripheral knobs and levers, also numbers to correspond with said knobs, in combination with a train of mechanism and a series of dial-fingers, and a single dial-finger rearwardly on the stem over a dial-plate fixed directly to the said plate-stem and rotating therewith, substantially as herein set forth.

3. In a cash-register, the register-dials, the cash-drawer, a bell, a central stem, and an operating-dial fixed on said central stem and having peripheral knobs and levers, and carrying inwardly an arm so disposed that said bell may be rung before the register is completed and before the opening of the cash-drawer, the several parts combined substantially as herein set forth.

4. In a cash register, the register-dials, an operating-lever, a cash-drawer, and an operating-dial having peripheral knobs and arms so disposed as to operate a lever, whereby a complete registry must be made by the dials before the cash-drawer is opened, substantially as herein set forth.

5. The combination, with the cash-drawer, its lid, and the vertical lever L, of the operating-dial C′, having knobs H and numbers to correspond therewith, the said knobs passing through the dial and provided on their inner ends with angular arms J, provided with springs K, so disposed as to engage with the upper end of the vertical lever L, and thus open the lid of the cash-drawer, substantially as herein set forth.

6. The combination of the central stem, D, the operating-dial C′, fixed thereon and carrying the knobs H and arms J, with the fixed arm r and train of mechanism, the bell k′, the spring d′, and a metal piece, a′, carrying a hammer, j′, the said arm being so disposed as to partially rotate said metal piece a′ and hammer j′, thus causing it to be thrown forcibly forward by the spring d′ against the bell k′, the said operating-dial being slightly rotated, substantially as herein set forth.

7. The combination of the operating-dial C′, knobs H, the arms J, springs K, the vertical lever L, keepers K′, spring S, hook M, lid O, till P, and springs Q, substantially as described.

8. The combination of the central stem, D, the operating-dial C′, the spur-wheels V, i, o, g, and k, the pinions f, g, and n, the sleeves, and dial-fingers a, m, and q, the stem D having at its rear end the removable sleeve E and dial-hand G, substantially as herein set forth.

9. The combination of the case B, the circular plate C, the bridge U, the door D, the operating-dial C′, the stem D, the adjustable sleeve E, the dial F, and the hand G with the arm r, the pawl s, the train of mechanism, the metal piece a′, the springs d′, the hammer j′, and the bell k′, substantially as herein set forth.

10. The combination of the case B, the operating-dial C′, the knobs H, arms J, the lever L, the cash-till P, and lid O with the train of mechanism carrying the dial-fingers, the arm v, metal piece a′, the hammer j′, and the bell k′, the whole arranged as and for the purpose substantially as herein set forth and described.

In testimony that I claim the foregoing I have hereunto set my hand this 9th day of February, 1886, in the presence of witnesses.

THOMAS MUNNELL.

Witnesses:
J. D. HAZELRIGG,
GEO. E. MILLER.